US009916302B2

(12) United States Patent
Tsuchida et al.

(10) Patent No.: US 9,916,302 B2
(45) Date of Patent: Mar. 13, 2018

(54) TEXT PROCESSING USING ENTAILMENT RECOGNITION, GROUP GENERATION, AND GROUP INTEGRATION

(71) Applicant: NEC Corporation, Tokyo (JP)

(72) Inventors: Masaaki Tsuchida, Tokyo (JP); Kai Ishikawa, Tokyo (JP); Takashi Onishi, Tokyo (JP); Kosuke Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/028,495

(22) PCT Filed: Jul. 10, 2015

(86) PCT No.: PCT/JP2015/003502
§ 371 (c)(1),
(2) Date: Apr. 11, 2016

(87) PCT Pub. No.: WO2016/013175
PCT Pub. Date: Jan. 28, 2016

(65) Prior Publication Data
US 2017/0124066 A1 May 4, 2017

(30) Foreign Application Priority Data

Jul. 22, 2014 (JP) ................................ 2014-148872

(51) Int. Cl.
*G06F 17/27* (2006.01)
*G06F 17/21* (2006.01)
*G06F 17/30* (2006.01)

(52) U.S. Cl.
CPC .......... *G06F 17/2785* (2013.01); *G06F 17/21* (2013.01); *G06F 17/30613* (2013.01); *G06F 17/30675* (2013.01); *G06F 17/30707* (2013.01)

(58) Field of Classification Search
USPC .......................... 704/1, 9, 10, 257, 270–275
See application file for complete search history.

(56) References Cited

U.S. PATENT DOCUMENTS

2007/0255555 A1* 11/2007 Crouch .................... G06N 5/02
704/9
2011/0276322 A1* 11/2011 Sandor ................ G06F 17/2235
704/9

(Continued)

FOREIGN PATENT DOCUMENTS

| JP | 09-152968 | 6/1997 |
| JP | 2013-190991 A | 9/2013 |
| WO | WO-2013-161850 A1 | 10/2013 |

OTHER PUBLICATIONS

International Search Report corresponding to PCT/JP2015/003502, dated Oct. 13, 2015, 4 pages.

(Continued)

*Primary Examiner* — Jesse Pullias
(74) *Attorney, Agent, or Firm* — Wilmer Cutler Pickering Hale and Dorr LLP

(57) ABSTRACT

Provided is a text processing system capable of classifying a plurality of texts into groups whose overviews are able to be grasped and classifying texts semantically having entailment relation into the same group even if the texts are not determined to have the entailment relation. Entailment recognition means 71 performs entailment recognition between texts on given texts. Group generation means 72 selects an individual text and generates a group including texts entailing the selected text as members. Group integration means 73 integrates groups in the case where groups satisfy a predetermined condition based on the degree of overlap of members between groups.

7 Claims, 11 Drawing Sheets

(56) References Cited

U.S. PATENT DOCUMENTS

| | | | |
|---|---|---|---|
| 2012/0124084 A1* | 5/2012 | Zhu | G06F 17/30967 707/769 |
| 2012/0284271 A1* | 11/2012 | Kuroiwa | G06F 17/2775 707/737 |
| 2013/0204611 A1* | 8/2013 | Tsuchida | G06F 17/3069 704/9 |
| 2014/0372102 A1* | 12/2014 | Hagege | G06F 17/278 704/9 |
| 2015/0120735 A1 | 4/2015 | Tsuchida et al. | |

OTHER PUBLICATIONS

Written Opinion of the International Searching Authority corresponding to PCT/JP2015/003502 with English translation and verification statement of English Translation, dated Oct. 13, 2015, 7 pages.

Ido Dagan et al., The PASCAL Recognising Textual Entailment Challenge, 2006, p. 1-15, [retrieval date Oct. 5, 2015], [online], Internet <URL : http://u.cs.biu.ac.il/~dagan/publications/RTEChallenge.pdf>.

Danilo Giampiccolo et al., The Third PASCAL Recognizing Textual Entailment Challenge, RTE '07 Proceeding of the ACL-PASCAL Workshop on Textual Entailment and Paraphrasing, ACM, Jun. 28, 2007, p. 1-9.

Jun Goto, et al., "A Disaster Information Analysis System Based on Question Answering", Journal of Natural Language Processing, Jun. 14, 2013, vol. 20, No. 3, p. 367-404.

Masaaki Tsuchida, Kai Ishikawa, "IKOMA at TAC2011: A Method for Recognizing Textual Entailment using Lexical-level and Sentence Structure-level features," [online], [searched on Jul. 10, 2014], the Internet <URL:http://www.nist.gov/tac/publications/2011/participant.papers/IKOMA.proceedings.pdf>, 5 pages.

Alexander Volokh et al., "Using MT-Based Metrics for RTE," [online], [searched on Jul. 10, 2014], the Internet <URL: http://www.nist.gov/tac/publications/2011/participant.papers/DFKI.proceedings.pdf>, 6 pages.

Alexander Volokh et al., "Combining Deterministic Dependency Parsing and Linear Classification for Robust RTE," [online], [searched on Jul. 10, 2014], the Internet <URL: http://www.nist.gov/tac/publications/2010/participant.papers/DFKI.proceedings.pdf>, 7 pages.

* cited by examiner

DELETE GROUP 16

FIG. 9

| REPRESENTATIVE TEXT |
|---|
| 3: The item is high price. |

| TEXTS IN GROUP | ATTRIBUTE INFORMATION (MONTH) |
|---|---|
| 3: The item is high price. | FEBRUARY |
| 7: I got satisfaction about the item, although it is high price. | APRIL |
| 15: I bought the item because of its good reputation, although I had dithered to buy it due to its high price. | JUNE |
| : | : |

FIG. 10

| REPRESENTATIVE TEXT | NUMBER OF TEXTS IN GROUP | JANUARY | FEBRUARY | MARCH | APRIL | MAY | JUNE | JULY | AUGUST | SEPTEMBER | OCTOBER | NOVEMBER | DECEMBER |
|---|---|---|---|---|---|---|---|---|---|---|---|---|---|
| The item is high price. | 228 | 42 | 56 | 36 | 40 | 23 | 19 | 7 | 3 | 0 | 2 | 0 | 0 |
| The design is good. | .. | .. | .. | .. | .. | .. | .. | .. | .. | .. | .. | .. | .. |
| .. | .. | .. | .. | .. | .. | .. | .. | .. | .. | .. | .. | .. | .. |

FIG. 13

1 : Yamada is prime minister of Japan.

2 : Premier is Yamada.

3 : Yamada cabinet starts.

4 : Yamada is premier.

5 : Japan's prime minister is Yamada.

FIG. 14

- This is high price but good design.
- You look nice on good design clothes because of your high height.
- This is low price but bad design.
  ⋮

TEXT PROCESSING USING ENTAILMENT RECOGNITION, GROUP GENERATION, AND GROUP INTEGRATION

CROSS-REFERENCE TO RELATED APPLICATIONS

This application is a national stage application of International Application No. PCT/JP2015/003502 entitled "TEXT PROCESSING SYSTEM, TEXT PROCESSING METHOD, AND TEXT PROCESSING PROGRAM," filed on Jul. 10, 2015, which claims the benefit of the priority of Japanese Patent Application No. 2014-148872 filed on Jul. 22, 2014, the disclosures of each of which are hereby incorporated by reference in their entirety.

TECHNICAL FIELD

The present invention relates to a text processing system, a text processing method, and a text processing program for grouping texts.

BACKGROUND ART

One type of processing on texts is entailment recognition. An example of the entailment recognition is described in Non Patent Literature (NPL) 1.

The entailment recognition is processing of determining whether or not the relation "A entails B" is present, where "A" and "B" are texts. Moreover, the term "A entails B" means that if A is true then B is true. Hereinafter, a relation that one text entails the other text will be referred to as "entailment relation" in some cases.

The entailment recognition method described in NPL 1 includes: giving consideration to the importance values of words; obtaining the total sum of the importance values of words in a text B and the sum of the importance values of words semantically appearing on a text A side, and regarding that A entails B if the ratio of the latter to the former is equal to or greater than a threshold value.

In addition to NPL 1, examples of the entailment recognition are also described in NPL 2, 3, and the like.

Moreover, as a method of grouping texts, there can be a method of clustering texts on the basis of the similarity of words used in the texts.

CITATION LIST

Non Patent Literature

NPL 1: Masaaki Tsuchida, Kai Ishikawa, "IKOMA at TAC2011: A Method for Recognizing Textual Entailment using Lexical-level and Sentence Structure-level features," [online], [searched on Jul. 10, 2014], the Internet <URL: http://www.nist.gov/tac/publications/2011/participant.papers/IKOMA.proceedings.pdf>

NPL 2: Alexander Volokh and 2 others, "Combining Deterministic Dependency Parsing and Linear Classification for Robust RTE," [online], [searched on Jul. 10, 2014], the Internet <URL: http://www.nist.gov/tac/publications/2010/participant.papers/DFKI.proceedings.pdf>

NPL 3: Alexander Volokh and 1 other, "Using MT-Based Metrics for RTE," [online], [searched on Jul. 10, 2014], the Internet <URL: http://www.nist.gov/tac/publications/2011/participant.papers/DFKI.proceedings.pdf>

SUMMARY OF INVENTION

Technical Problem

It seems appropriate that paraphrasing rules are applied to the entailment recognition. For example, it is assumed that the entailment recognition is performed for five texts illustrated in FIG. 13. In FIG. 13, a numeral preceding each text indicates the ID of the text. In this example, when determining whether or not A entails B, wording is paraphrased by applying the paraphrasing rules to the text corresponding to B. If all content words in the text corresponding to B appear in the text corresponding to A, A is determined to entail B. In addition, it is assumed that the following paraphrasing rules are present as paraphrasing rules.

[Paraphrasing Rules]

A word "premier" is paraphrased into "prime minister."

A wording "'X' cabinet starts" is paraphrased into "'X' is premier."

In this case, there is achieved a result that each of texts 1, 2, 4, and 5 entails text 2, a result that each of texts 1, 2, 3, 4, and 5 entails text 3, or the like. Note here that, in the light of the meanings of the texts, it can be said that the text 3 entails the text 2, but it is not determined that the text 3 entails the text 2. In this case, for example, if the following paraphrasing rule is added to the above paraphrasing rules, it is determined that the text 3 entails the text 2.

[Paraphrasing Rule]

A wording "Premier is 'A'" is paraphrased into a wording "'A' cabinet starts."

In this manner, the accuracy of entailment recognition is improved by adding a paraphrasing rule. In order to improve the accuracy of entailment recognition, it is necessary to increase the paraphrasing rules, thereby causing an increase in a load on the preparation of paraphrasing rules.

Moreover, preferably texts including the same meaning are interpreted as those of the same group and the overview of the texts is able to be grasped through the group.

Incidentally, even in the case of a pair of texts determined not to have any entailment relation as a result of entailment recognition, preferably the pair of texts are included in the same group if the texts semantically have the entailment relation.

Even if the texts in the group are referenced, the overview of the group is not able to be grasped unless the group can be interpreted. The method of clustering texts on the basis of the similarity of words used in the texts tends to generate a cluster whose overview is not able to be grasped. FIG. 14 is a schematic diagram illustrating an example of a cluster obtained in the case of clustering texts on the basis of the similarity of words. As illustrated in FIG. 14, there is no knowledge particularly readable in the cluster obtained as a result of clustering texts simply on the basis of the similarity of words.

Therefore, it is an object of the present invention to provide a text processing system, a text processing method and a text processing program capable of classifying a plurality of texts into groups whose overviews are able to be grasped and capable of classifying texts semantically having an entailment relation into the same group, even if the texts are not determined to have the entailment relation.

Solution to Problem

According to the present invention, there is provided a text processing system including: entailment recognition means for performing entailment recognition between texts on given texts; group generation means for selecting an individual text and generating a group including texts entailing the selected text as members; and group integration means for integrating groups in the case where groups satisfy a predetermined condition based on the degree of overlap of members between the groups.

Furthermore, according to the present invention, there is provided a text processing method including: performing entailment recognition between texts on given texts; selecting an individual text and generating a group including texts entailing the selected text as members; and integrating groups in the case where groups satisfy a predetermined condition based on the degree of overlap of members between the groups.

Furthermore, according to the present invention, there is provided a text processing program causing a computer to perform: entailment recognition processing of performing entailment recognition between texts on given texts; group generation processing of selecting an individual text and generating a group including texts entailing the selected text as members; and group integration processing of integrating groups in the case where groups satisfy a predetermined condition based on the degree of overlap of members between the groups.

Advantageous Effects of Invention

According to the present invention, it is possible to classify a plurality of texts into groups whose overviews are able to be grasped and to classify texts semantically having an entailment relation into the same group, even if the texts are not determined to have the entailment relation.

BRIEF DESCRIPTION OF DRAWINGS

FIG. 9 is a schematic diagram illustrating an example of a group after integration.

FIG. 10 is a schematic diagram illustrating a display example of a result of analysis performed by an analysis unit.

FIG. 13 is a schematic diagram illustrating an example of texts as the objects of the entailment recognition.

FIG. 14 is a schematic diagram illustrating an example of a cluster obtained by clustering texts on the basis of the similarity of words.

DESCRIPTION OF EMBODIMENT

Hereinafter, the exemplary embodiments of the present invention will be described with reference to accompanying drawings.

Exemplary Embodiment 1

Figure 1:
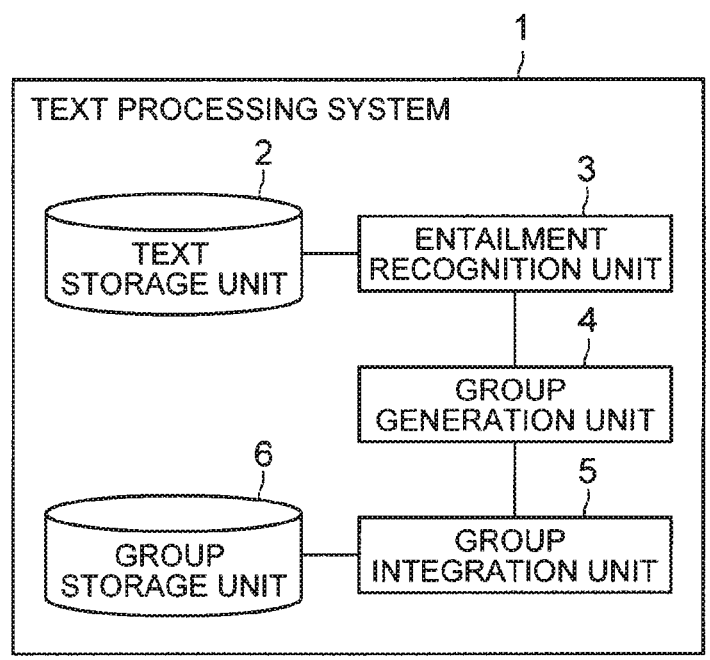
FIG. 1 is a block diagram illustrating an example of a text processing system according to a first exemplary embodiment of the present invention.

FIG. 1 is a block diagram illustrating an example of a text processing system according to a first exemplary embodiment of the present invention. In the first exemplary embodiment, the text processing system 1 includes a text storage unit 2, an entailment recognition unit 3, a group generation unit 4, a group integration unit 5, and a group storage unit 6.

The text storage unit 2 is a storage device which previously stores a plurality of texts as the objects of grouping.

IDs are previously assigned and appended to individual texts stored in the text storage unit 2 (in other words, individual texts as the objects of grouping). Even in the case of texts whose character strings coincide with each other, different IDs are assigned to the texts if the sources of the texts differ from each other. For example, it is assumed that texts obtained from a questionnaire are stored in the text storage unit 2. It is then assumed that a text composed of exactly the same character strings "The item is high price." has been obtained from five persons independently. In this case, different IDs are assigned to the five texts "The item is high price." obtained from the five persons. Texts having different IDs are treated as different texts even if the character strings of the texts are the same. Although the description has been made in this example by giving an example that texts obtained from a questionnaire are stored in the text storage unit 2, the collection mode of texts stored in the text storage unit 2 is not particularly limited. For example, texts representing comments submitted to a call center may be stored in the text storage unit 2.

Hereinafter, the IDs of texts are indicated by numerals such as "1," "2," "3," and the like for ease of explanation, but the representations of the IDs are not limited to numerals. In addition, a text having an ID "n" is referred to as text "n" in the following description.

The entailment recognition unit 3 performs entailment recognition between texts on the individual texts stored in the text storage unit 2.

Specifically, the entailment recognition unit 3 sets all pairs of texts where each pair is composed of two texts. When setting the pair of two texts, the entailment recognition unit 3 sets the order of the two texts and separately sets the pairs each of which is composed of the two texts depending on which of the two texts is prior to the other. For example, the entailment recognition unit 3 sets a pair (1, 2) and a pair (2, 1) as pairs different from each other. Incidentally, it is assumed that the parentheses represent a pair of texts and the numerals in parentheses represent the IDs of texts. In the pair of texts, the text prior to the other is referred to as "first text" and the subsequent text is referred to as "second text."

The entailment recognition unit 3 also sets a pair including two texts having the same ID redundantly. For example, the entailment recognition unit 3 sets pairs such as (1, 1), (2, 2), and the like individually. In this case, the IDs are the same as each other. Therefore, if pairs of texts with the order of the IDs replaced with each other are created, the same pairs are created redundantly. The entailment recognition unit 3, however, does not create such redundant pairs.

The entailment recognition unit 3 performs entailment recognition for each pair after setting the respective pairs as described above. Specifically, the entailment recognition unit 3 determines whether or not there is a relation in which the first text entails the second text for each pair. The entailment recognition method is not particularly limited, but the entailment recognition may be a publicly-known method. For example, the entailment recognition unit 3 may perform the entailment recognition in a method described in NPL 1, NPL 2, or NPL 3.

Figure 2:
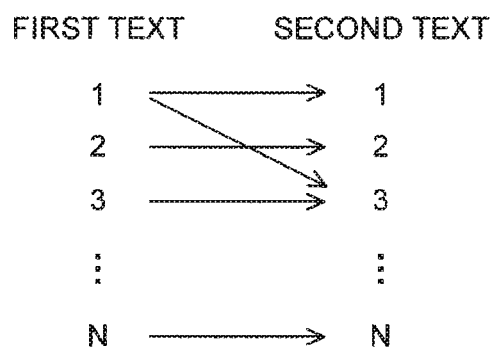
FIG. 2 is a schematic diagram illustrating an example of a result of entailment recognition performed by an entailment recognition unit.

FIG. 2 is a schematic diagram illustrating an example of a result of entailment recognition performed by the entailment recognition unit 3. In FIG. 2, texts are represented by IDs. In the example illustrated in FIG. 2, if there is an entailment relation such that the first text entails the second text, the arrow from the first text to the second text schematically indicates that there is the entailment relation between the first and second texts. If there is no entailment relation between these texts, omission of the arrow from the first text to the second text indicates that there is no entailment relation between the first and second texts. For example, the example in FIG. 2 illustrates that there is an entailment relation such that "1" entails "3" in a pair (1, 3). Additionally, the example in FIG. 2 illustrates that there is no entailment relation that "2" entails "3" in a pair (2, 3). Furthermore, in a pair including two texts having the same ID redundantly like (1, 1), (2, 2), or the like, it is determined that there is an entailment relation such that the first text entails the second text (see FIG. 2).

The group generation unit 4 selects individual texts one by one and generates a group including texts entailing the selected text as members. Therefore, the number of groups generated by the group generation unit 4 coincides with the number of texts. Hereinafter, the selected text will be referred to as "representative text" in some cases. It can be said that, with an individual text as a representative text, the group generation unit 4 generates a group including texts entailing the representative text as members.

For example, it is assumed that the entailment recognition result illustrated in FIG. 2 has been obtained. In this case, if text "3" is selected, the group generation unit 4 generates a group including text "1," text "3," and the like as members, with text "3" as a representative text. The representative text also falls under a member of the group corresponding to the representative text. Moreover, if the group is different, the representative text thereof is different, too.

When the group generation unit 4 generates groups, a certain text may be a member of a plurality of groups. For example, text "1" may be a member of a plurality of groups. The same applies to texts having other IDs.

The groups generated by the group generation unit 4 are groups in the initial state which have not been integrated yet by the group integration unit 5. Therefore, the groups generated by the group generation unit 4 may be referred to as "initial groups."

Figure 3:
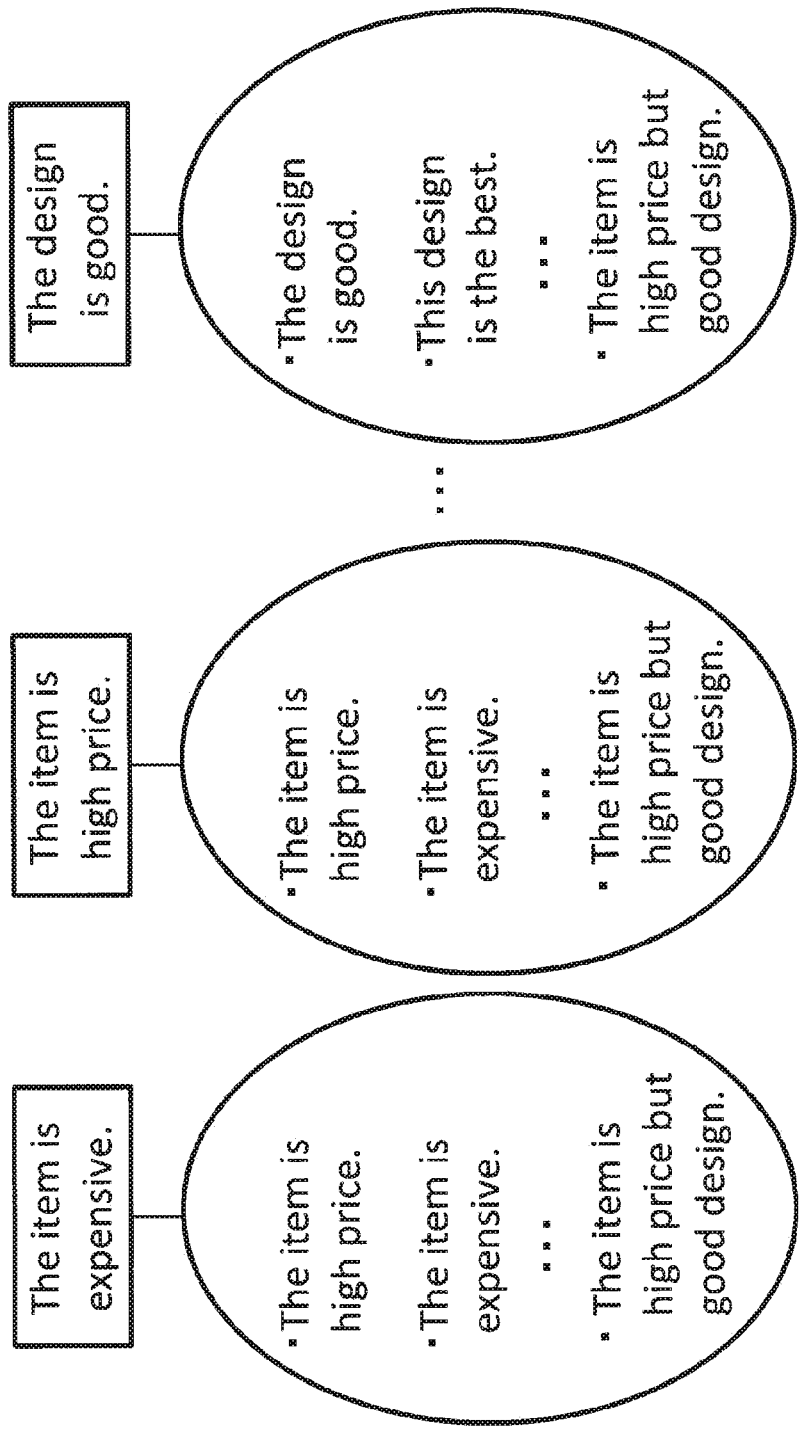
FIG. 3 is a schematic diagram illustrating an example of initial groups.

FIG. 3 is a schematic diagram illustrating an example of initial groups. In FIG. 3, an ellipse represents a group and texts in the ellipse represent texts belonging to the group. Furthermore, the text illustrated in the upper side of the ellipse is a representative text. In FIG. 3, the IDs of texts are not illustrated. The group generation unit 4 specifies individual texts as representative texts, respectively, and therefore the redundancy of the groups is high in the stage of the initial group generation. In the example illustrated in FIG. 3, a group having a text "The item is expensive." as the representative text and a group having a text "The item is high price." as the representative text are similar groups having the same members. At the time point when the group generation unit 4 generates the initial groups, a plurality of groups similar to each other as described above is generated.

The group integration unit 5 removes the redundancy of the groups by integrating the similar groups.

The group integration unit 5 selects two groups different from each other, determines whether or not to integrate the two groups on the basis of the degree of overlap of members between the two groups, and integrates the two groups into one group on condition that the groups are determined to be integrated. The group integration unit 5 repeats this operation until no two groups to be integrated exist. More specific processing of the group integration unit 5 will be described later.

The group storage unit 6 is a storage device which stores information on groups remaining after the integration. The group integration unit 5 causes the group storage unit 6 to store the representative text and the texts as the members of the group, for example, for each group remaining after the integration.

The entailment recognition unit 3, the group generation unit 4, and the group integration unit 5 are implemented by, for example, the CPU of a computer operating according to the text processing program. In this case, the CPU may read the text processing program from a program recording medium such as, for example, a program storage device (not illustrated in FIG. 1) of the computer and then operate as the entailment recognition unit 3, the group generation unit 4, and the group integration unit 5 according to the text processing program. Furthermore, the entailment recognition unit 3, the group generation unit 4, and the group integration unit 5 may be implemented by different pieces of hardware.

The text processing system 1 may have a configuration in which two or more physically-separated devices are wired or wirelessly connected to each other. The same applies to the respective exemplary embodiments described later.

Figure 4:
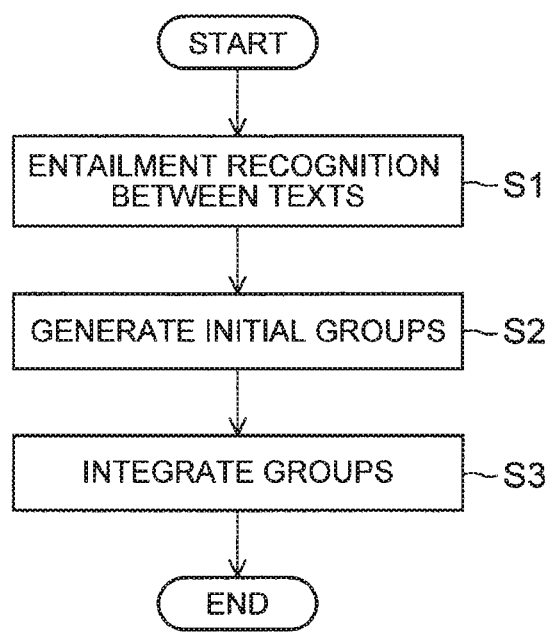
FIG. 4 is a flowchart illustrating an example of the progress of processing according to the first exemplary embodiment of the present invention.

Subsequently, the progress of processing will be described. FIG. 4 is a flowchart illustrating an example of the progress of processing according to the first exemplary embodiment of the present invention.

The entailment recognition unit 3 reads out the texts stored in the text storage unit 2 and performs entailment recognition between texts on these texts (step S1). As has been described, the entailment recognition unit 3 sets all pairs of texts and determines whether or not there is a relation in which the first text entails the second text for each pair. The method of entailment recognition is not particularly limited.

Subsequently, the group generation unit 4 generates initial groups (step S2). Specifically, the group generation unit 4 selects individual texts one by one and generates a group including texts entailing the selected text as members.

Subsequently, the group integration unit 5 integrates similar groups (step S3). As described above, the group integration unit 5 selects two groups different from each other, determines whether or not to integrate the two groups on the basis of the degree of overlap of members between the two groups, and integrates the two groups into one group on condition that the groups are determined to be integrated. The group integration unit 5 repeats this operation until no two groups to be integrated exist.

The processing of step S3 will be described in more detail.

The group integration unit 5 may perform the processing of determining whether or not to integrate the two groups on the basis of the degree of overlap of members between two groups, for example, as described below. The group integration unit 5 calculates the Jaccard indices of the two groups. If the Jaccard index is equal to or greater than a predetermined threshold value, the group integration unit 5 may determine to integrate the two groups. If the Jaccard index is less than the threshold value, the group integration unit 5 may determine not to integrate the two groups. The group integration unit 5 may calculate the Jaccard index by calculating the following expression (1).

[Math. 1]

$$C = \frac{|P \cap Q|}{|P \cup Q|} \quad \text{expression (1)}$$

In expression (1), P and Q represent groups, respectively. C is a Jaccard index. The group integration unit 5 may calculate the Jaccard index by dividing the number of members belonging to a set intersection of the two groups by the number of members belonging to a sum of sets of the two groups.

It can be said that the Jaccard index is the similarity degree of groups based on the degree of overlap of members between groups. The group integration unit 5 may calculate the similarity degree by any calculation other than the calculation of the expression (1). As other examples of the similarity degree, there are cited the dice coefficient, the Simpson's coefficient, the cosine similarity degree, and the like.

Moreover, in the case where the group integration unit 5 determines to integrate two groups and integrates the two groups into one group, for example, the group integration unit 5 may perform processing as described below. The group integration unit 5 decides a group including a smaller number of members as a group to be deleted out of the two groups and determines a group including a larger number of members as a group to be left as a result of the integration. Hereinafter, the group including the smaller number of members is referred to as "minority group" and the group including the larger number of members is referred to as "majority group" in some cases. If the number of members is the same between the two groups, the group integration unit 5 may decide either one as the minority group. The group integration unit 5 transfers members of the minority group not overlapping any members of the majority group to the majority group and then deletes the minority group.

Figure 5:
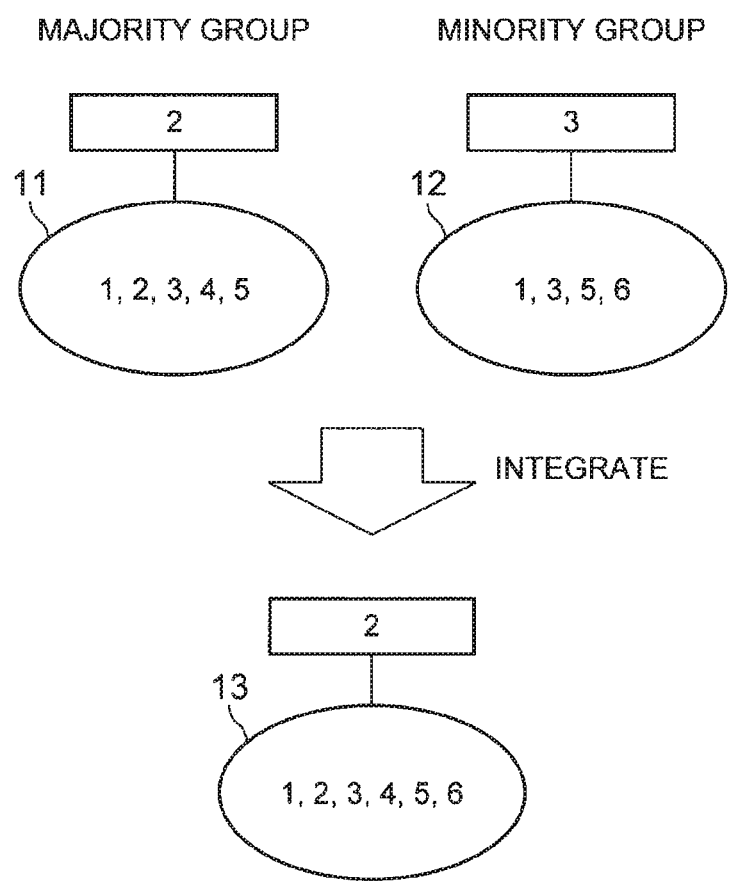
FIG. 5 is a schematic diagram illustrating an example of integration.

FIG. 5 is a schematic diagram illustrating an example of integration. Similarly to the case illustrated in FIG. 3, an ellipse represents a group. In FIG. 5, numerals in the ellipse are the IDs of members (texts) belonging to the group. Moreover, a numeral illustrated in the upper side of the ellipse is the ID of a representative text. Moreover, in the example illustrated in FIG. 5, the number of members of a group 11 is larger than the number of members of a group 12. Therefore, the group 11 is a majority group and the group 12 is a minority group. Among the members of the minority group 12, a member not overlapping any members of the majority group 11 is a text "6." Therefore, the group integration unit 5 transfers the text "6" of the minority group 12 to the majority group 11. As a result, the text "6" becomes a member of the majority group 11. Incidentally, if a plurality of members not overlapping the members of the majority group 11 is present among the members of the minority group 12, the group integration unit 5 transfers all of those members to the majority group 11. After transferring the members, the group integration unit 5 deletes the minority group 12. As a result, an integrated group 13 including texts "1," "2," "3," "4," "5," and "6" as members is achieved (see FIG. 5).

At the time of integration, the group integration unit 5 does not change the representative text of the majority group 11. Therefore, the representative text of the integrated group 13 is the same as the representative text of the majority group 11. Moreover, since the integration is performed as described above, it is possible to maintain the state where, if groups are different from each other, the representative texts are also different from each other.

Figure 6:
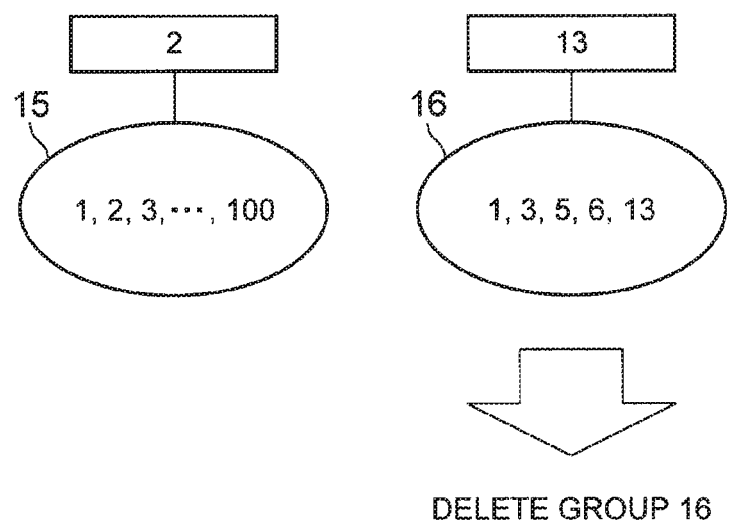
FIG. 6 is a schematic diagram illustrating an example of deleting a group in which a predetermined ratio or more of the members are also members of any other group.

Furthermore, in step S3, if a predetermined ratio or more of the members among the members of one group (referred to as "group X") are members of any other group, the group integration unit 5 may delete the group X. FIG. 6 is a schematic diagram illustrating an example of deleting a group in which a predetermined ratio or more of the members are members of any other group. Similarly to the case illustrated in FIG. 5, an ellipse represents a group. Moreover, the numerals in the ellipse are the IDs of members (texts) belonging to the group. A numeral illustrated in the upper side of the ellipse is the ID of a representative text. In this exemplary embodiment, the description will be made by giving an example of a case where the predetermined ratio is 100%.

The number of members of a group 16 illustrated in FIG. 6 is 5. All of the five members belonging to the group 16 correspond to the members of a group 15. Therefore, 100% of members of the group 16 correspond to the member of the other group 15. Accordingly, the group integration unit 5 deletes the group 16.

Incidentally, the aforementioned predetermined ratio need not be 100%. For example, it is assumed that the above predetermined ratio is 98%. In this case, if 98% or more of the members among the members of a certain group X belong to any other group, the group integration unit 5 deletes the group X.

When two groups to be integrated are not present any more, the group integration unit 5 causes the group storage unit 6 to store the representative text and texts as members of the group for each group remaining at the time.

The above description has been made by giving an example that the text storage unit 2 previously stores a plurality of texts as the objects of grouping. Alternatively, the plurality of texts as objects of grouping is input from the outside via an input interface and processing may be started with the texts as objects. The same applies to the respective exemplary embodiments described later.

It is assumed that the groups 11 and 12 illustrated in FIG. 5 are initial groups. In the example illustrated in FIG. 5, the text "6" is not a member of the group 11 having the text "2" as the representative text. Therefore, it is understood that the text "6" has been determined not to entail the text "2." If, however, the similarity degree between the groups 11 and 12 is high and the group integration unit 5 determined to integrate the groups 11 and 12, it is thought that the text "6" semantically entails the text "2." In this exemplary embodiment, in such a case, the group integration unit 5 integrates the groups 11 and 12 and the text "6" is included in the members of the integrated group 13 with the text "2" as the representative text. Therefore, it can be determined that the text "6" entails the text "2" from the integrated group 13. In this manner, according to the exemplary embodiment, it is possible to classify texts semantically having an entailment relation into the same group even if the texts are not determined to have the entailment relation.

Moreover, according to the present exemplary embodiment, in each group, each text belonging to each group entails the representative text of the group. Therefore, individual groups are able to be interpreted, thereby enabling the overviews of the groups to be grasped.

Exemplary Embodiment 2

Figure 7:
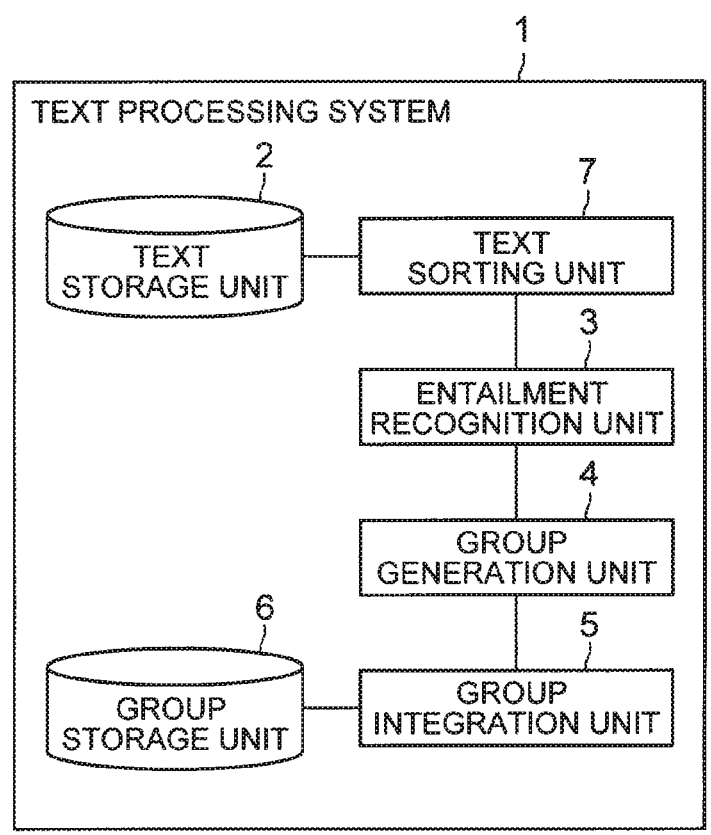
FIG. 7 is a block diagram illustrating an example of a text processing system according to a second exemplary embodiment of the present invention.

FIG. 7 is a block diagram illustrating an example of a text processing system according to a second exemplary embodiment of the present invention. The same reference numerals as those of FIG. 1 are used for the same elements as in the first exemplary embodiment and the description thereof is omitted here. In the second exemplary embodiment, the text processing system 1 includes a text storage unit 2, a text sorting unit 7, an entailment recognition unit 3, a group generation unit 4, a group integration unit 5, and a group storage unit 6.

The text sorting unit 7 sorts out a text satisfying a predetermined condition from the respective texts stored in the text storage unit 2 and inputs the texts sorted out into the entailment recognition unit 3.

The condition on sorting out the text is specified by, for example, an operator of the text processing system 1. The text processing system 1 accepts an input of a condition on sorting out a text, for example, through an input interface (not illustrated in FIG. 7).

An operator may set the condition on sorting out a text according to the purpose of analysis of the text and may input the condition into the text processing system 1.

For example, it is assumed that the text storage unit 2 stores texts obtained from a questionnaire. Then, it is assumed that the operator would like to analyze texts describing comments on a design among the texts collected by the questionnaire. In this case, the operator may input a condition such as, for example, "including a word, 'design'" into the text processing system 1. Thereupon, the text sorting unit 7 sorts out only texts including a word "design" out of texts stored in the text storage unit 2 and inputs the texts into the entailment recognition unit 3.

The entailment recognition unit 3 performs entailment recognition between texts on the input individual texts. The subsequent operations are the same as those of the first exemplary embodiment and therefore the description of the operations is omitted here.

Although the above example illustrates a case where the condition "including a specific word" is specified, the condition on sorting out texts is not limited the condition.

The text sorting unit 7 is implemented by the CPU of a computer operating according to, for example, the text processing program. In addition, the elements including the text sorting unit 7 may be implemented by pieces of hardware different from each other.

In the second exemplary embodiment, the same advantageous effects as those of the first exemplary embodiment are obtained. Furthermore, in the second exemplary embodiment, the text sorting unit 7 sorts out texts satisfying a predetermined condition and the entailment recognition unit 3, the group generation unit 4, and the group integration unit 5 perform the same processing (steps S1 to S3: see FIG. 4) as in the first exemplary embodiment for the text sorted out. Therefore, all of the individual groups obtained as a result of the integration of groups have members as texts satisfying the predetermined condition. Therefore, in the second exemplary embodiment, it is possible to generate a group whose overview is easily grasped after narrowing down texts including the content that the operator would like to focus on. As a result, a knowledge answering an analysis purpose is obtained from the generated group.

Moreover, in the second exemplary embodiment, the text sorting unit 7 sorts out texts before performing processing of the step S1 and subsequent steps described in the first exemplary embodiment. This enables a reduction in the calculation amount of the processing of step S1 and subsequent steps.

Exemplary Embodiment 3

Figure 8:
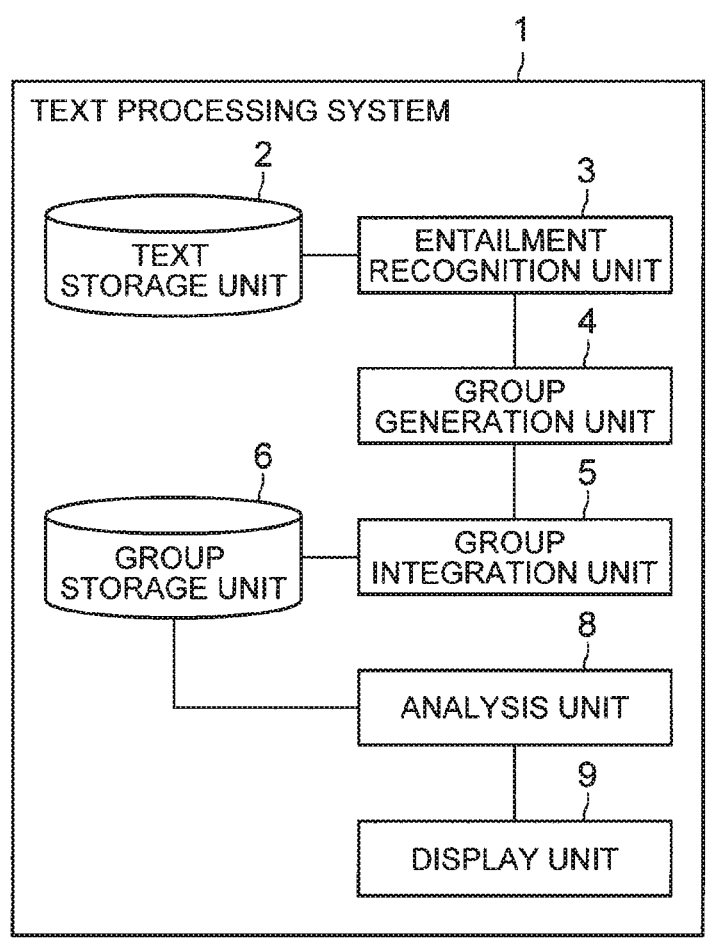
FIG. 8 is a block diagram illustrating an example of a text processing system according to a third exemplary embodiment of the present invention.

FIG. 8 is a block diagram illustrating an example of a text processing system according to a third exemplary embodiment of the present invention. The same reference numerals as those of FIG. 1 are used for the same elements as in the first exemplary embodiment and the description thereof is omitted here. In the third exemplary embodiment, the text processing system 1 includes a text storage unit 2, an entailment recognition unit 3, a group generation unit 4, a group integration unit 5, and a group storage unit 6, an analysis unit 8, and a display unit 9.

The display unit 9 is a display device.

In the third exemplary embodiment, the individual texts stored in the text storage unit 2 are associated with attribute information representing the attributes of the texts. As an example of the attribute information, there is cited, for example, information representing the date when a text is obtained or the like. It is, however, only illustrative, and which information is used as the attribute information is not particularly limited. The text storage unit 2 has only to store the text and the attribute information thereof associated with each other.

The analysis unit 8 reads out the information on the groups (in other words, the groups remaining after the integration of groups performed by the group integration unit 5) stored in the group storage unit 6 and analyzes the texts in the groups on the basis of the attribute information of the texts in the groups.

Hereinafter, an example of the analysis performed by the analysis unit 8 is described. For example, the analysis unit 8 reads out the representative texts of the respective groups and the texts as the members of the groups from the group storage unit 6. Moreover, the analysis unit 8 reads out the attribute information of the texts from the text storage unit 2. Then, the analysis unit 8 counts the number of corresponding texts for each division of the attribute value of the attribute information. The analysis unit 8 performs the processing for each group. Specifically, the analysis unit 8 performs cross tabulation of texts by group and by division of an attribute value.

If the attribute value is represented by a continuously-varying numeral value, the division of the attribute value may be set by dividing the values allowed for the attribute values at predetermined intervals. For example, if the attribute information is a date, sections may be previously set by dividing the attribute values for each month such as, for example, "Jun. 1, 2014 to Jun. 30, 2014," "Jul. 1, 2014 to Jul. 31, 2014," or the like. Moreover, if the attribute value is not a continuously-varying numerical value, but a selectively-extracted item, an individual item may be set as one division.

FIG. 9 is a schematic diagram illustrating an example of a group after integration. In FIG. 9, there is illustrated a group with a text "The item is high price." as the representative text of the group. The numeral at the beginning of each text is the ID of each text.

In the example illustrated in FIG. 9, information on a month when each text is obtained is associated with the text as the attribute information. In this example, each of the individual months such as "January," "February," and the like is assumed to be one division. The analysis unit 8 counts the number of texts corresponding to the division "January" within the group illustrated in FIG. 9. The analysis unit 8 also counts the number of texts corresponding to other divisions (in other words, other months) within the group illustrated in FIG. 9.

Furthermore, the analysis unit 8 performs the same processing regarding other individual groups. Then, the analysis unit 8 causes the display unit 9 to display the number of texts counted by group and by month.

FIG. 10 is a schematic diagram illustrating a display example of a result of analysis performed by the analysis unit 8. FIG. 10 illustrates a display example of a result of the cross tabulation. In the example illustrated in FIG. 10, one row corresponds to one group. The representative text varies with each group, thereby enabling a group to be identified by the representative text. In the example illustrated in FIG. 10, the present invention is able to present how the number of obtained texts entailing the representative text changes with month. In addition, the analysis unit 8 may display the number of texts belonging to the group for each group as illustrated in FIG. 10.

Although the present invention has been described by giving an example that the analysis unit 8 performs the cross tabulation in the above exemplary embodiment, the mode of the analysis performed by the analysis unit 8 is not particularly limited. For example, the analysis unit 8 may perform correlation analysis.

The analysis unit 8 is implemented by, for example, the CPU of a computer operating according to the text processing program. Moreover, the elements including the text sorting unit 7 may be implemented by pieces of hardware different from each other.

In the third exemplary embodiment, the text processing system 1 may be provided with the text sorting unit 7 which has been described in the second exemplary embodiment.

The text processing system 1 according to the third exemplary embodiment performs group analysis by using the group of a text entailing the representative text and attribute information associated with the text. Therefore, it is possible to obtain a knowledge that has never been obtained only by reference to a group.

It can be said that the integration of groups in each exemplary embodiment described above is an operation of integrating groups in the case where groups satisfy a predetermined condition based on the degree of overlap of members between groups.

In each exemplary embodiment described above, the group integration unit 5 may integrate groups as described below.

After generating groups, the group integration unit 5 creates index information for searching for each group including a text as a member with respect to individual texts. The group integration unit 5 may use the identification information of each group including the text as index information.

Then, the group integration unit 5 selects one group and identifies each of other groups including a member of the group by reference to the index information. If each of the identified groups and the selected group satisfy the condition, the group integration unit 5 integrates each of the identified groups and the selected group. The group integration unit 5 repeats this processing until no groups to be integrated exist. Similarly to the above exemplary embodiments, the above condition may be, for example, a condition that the similarity degree (for example, Jaccard index) of groups based on the degree of overlap of members between groups is equal to or greater than a threshold value. Furthermore, in the case of integrating groups in this example, the group integration unit 5 may transfer a member, for example, which is a member of any other group including the member of the selected group, but is not a member of the selected group, to the selected group and then delete other groups concerned.

It can be said that the group integration as described in this example is also an operation of integrating groups in the case where groups satisfy a predetermined condition based on the degree of overlap of members between groups.

Figure 11:
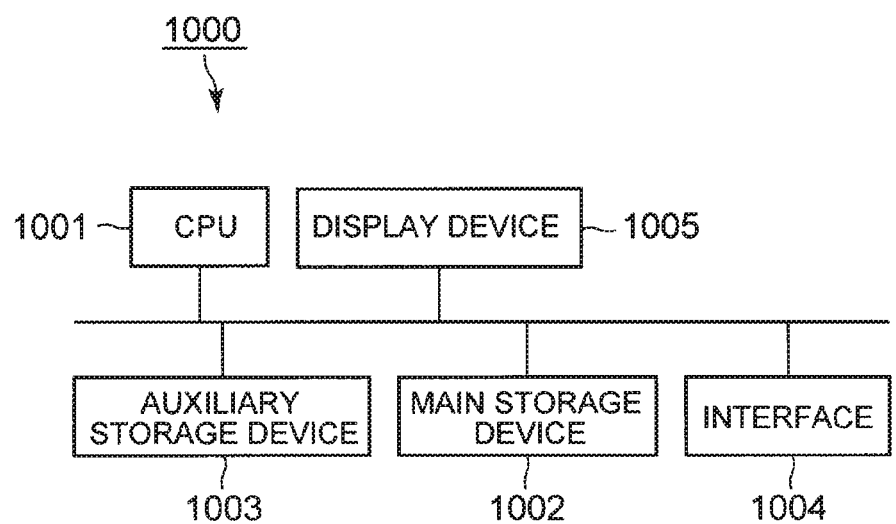
FIG. 11 is a schematic block diagram illustrating a configuration example of a computer according to the respective exemplary embodiments of the present invention.

FIG. 11 is a schematic block diagram illustrating a configuration example of a computer according to the respective exemplary embodiments of the present invention. A computer 1000 includes a CPU 1001, a main storage device 1002, an auxiliary storage device 1003, an interface 1004, and a display device 1005.

The above text processing system 1 is installed in the computer 1000. The operation of the text processing system 1 is stored in the auxiliary storage device 1003 in the form of a program (text processing program). The CPU 1001 reads out the program from the auxiliary storage device 1003, develops the program to the main storage device 1002, and performs the above processing according to the program.

The auxiliary storage device 1003 is an example of a non-transitory tangible medium. As other examples of the non-transitory tangible medium, there are cited a magnetic disk, a magnetic optical disk, a CD-ROM, a DVD-ROM, a semiconductor memory, or the like connected via the interface 1004. Moreover, in the case where the program is distributed to the computer 1000 via communication lines, the computer 1000 which has received the distributed program may develop the program to the main storage device 1002 and perform the above processing.

Furthermore, the program may be for use in implementing a part of the above processing. Moreover, the program may be a differential program for implementing the above processing by a combination with another program already stored in the auxiliary storage device 1003.

Figure 12:
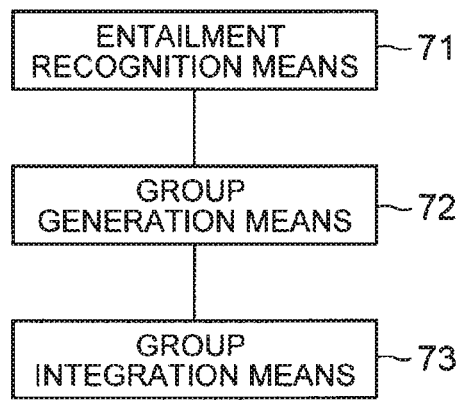
FIG. 12 is a block diagram illustrating an example of the minimum configuration of the text processing system of the present invention.

Subsequently, the minimum configuration of the present invention will be described. FIG. 12 is a block diagram illustrating an example of the minimum configuration of the text processing system of the present invention. The text processing system of the present invention includes entailment recognition means 71, group generation means 72, and group integration means 73.

The entailment recognition means 71 (for example, the entailment recognition unit 3) performs entailment recognition between texts on given texts.

The group generation means 72 (for example, the group generation unit 4) selects an individual text and generates a group including texts entailing the selected text as members.

The group integration means 73 (for example, the group integration unit 5) integrates groups in the case where groups satisfy a predetermined condition based on the degree of overlap of members between groups.

The above configuration enables a plurality of texts to be classified into groups whose overviews are able to be grasped and enables texts semantically having entailment relation to be classified into the same group even if the texts are not determined to have the entailment relation.

The group integration means 73 selects two groups different from each other, determines whether or not to integrate the two groups on the basis of the degree of overlap of members between the two groups, and integrates the two groups into one group on condition that the groups are determined to be integrated. The group integration means 73 may be configured to repeat this processing until no two groups to be integrated exist.

Moreover, when integrating two groups into one group, the group integration means 73 may be configured to transfer members, among the members of a group including a smaller number of members, not overlapping members of a group including a larger number of members to the group including the larger number of members and to delete the group including the smaller number of members.

Moreover, the group integration means 73 may create index information for searching for each group including texts as members with respect to each text. In addition, the group integration means 73 may be configured to repeat the following processing until no groups to be integrated exist: selecting one group; identifying each of other groups including a member of the selected group by reference to the index information; and integrating the identified group and the selected group if the identified group and the selected group satisfy a predetermined condition.

Furthermore, the group integration means 73 may be configured to delete a group if a predetermined ratio or more of the members of the group are members of any other group.

Moreover, the present invention may be provided with text sorting means (for example, the text sorting unit 7) for sorting out texts satisfying a predetermined condition from given texts, so that the entailment recognition means 71 perform entailment recognition between texts sorted out by the text sorting means.

Furthermore, the present invention may be provided with analysis means (for example, the analysis unit 8) for analyzing texts of groups remaining after group integration performed by the group integration means 73, on the basis of attribute information of the texts of the groups, where the attribute information is previously associated with individual texts.

Although the present invention has been described with reference to the exemplary embodiments hereinabove, the present invention is not limited thereto. A variety of changes, which can be understood by those skilled in the art, may be made in the configuration and details of the present invention within the scope thereof.

This application claims priority to Japanese Patent Application No. 2014-148872 filed on Jul. 22, 2014, and the entire disclosure thereof is hereby incorporated herein by reference.

INDUSTRIAL APPLICABILITY

The present invention is suitably applicable to grouping of a plurality of texts.

REFERENCE SIGNS LIST

1 Text processing system
2 Text storage unit
3 Entailment recognition unit
4 Group generation unit
5 Group integration unit
6 Group storage unit
7 Text sorting unit
8 Analysis unit
9 Display unit

The invention claimed is:

1. A text processing system comprising:
an entailment recognition unit, implemented by a processor, for performing entailment recognition between texts on given texts;
a group generation unit, implemented by the processor, for selecting an individual text and generating a group including texts entailing the selected text as members; and
a group integration unit, implemented by the processor, for integrating groups in the case where groups satisfy a condition that the degree of overlap of members between the groups is equal to or greater than a predetermined threshold value;
wherein the group integration unit selects two groups different from each other, determines whether or not to integrate the two selected groups on the basis of the degree of overlap of members between the two selected groups, and integrates the two selected groups into one group on condition that the groups are determined to be integrated, and repeats this operation until no two groups to be integrated exist;
wherein the text processing system further comprising an analysis unit, implemented by the processor, for analyzing texts of groups remaining after group integration performed by the group integration unit, on the basis of attribute information of the texts of the remaining groups, where the attribute information is previously associated with individual texts.

2. The text processing system according to claim 1, wherein, in the case of integrating two groups into one group, the group integration unit transfers members, among the members of a group including a smaller number of members, not overlapping members of a group including a larger number of members to the group including the larger number of members and deletes the group including the smaller number of members.

3. The text processing system according to claim 1, wherein:
the group integration unit creates index information for searching for each group including texts as members with respect to each text; and
the group integration unit selects one group, identifies each of other groups including a member of the selected group by reference to the index information, and integrates each of the identified groups and the selected group if each of the identified groups and the selected group satisfy the condition, and thereafter repeats this operation until no groups to be integrated exist.

4. The text processing system according to claim 1, wherein, if a predetermined ratio or more of the members of one group are members of any other group, the group integration unit deletes the one group.

5. The text processing system according to claim 1, further comprising a text sorting unit, implemented by the processor, for sorting out texts satisfying a predetermined condition from given texts, wherein the entailment recognition unit performs entailment recognition between texts sorted out by the text sorting unit.

6. A text processing method comprising:
- (a) performing, by a processor, entailment recognition between texts on given texts;
- (b) selecting, by the processor, an individual text and generating a group including texts entailing the selected text as members;
- (c) integrating, by the processor, groups in the case where groups satisfy a condition that the degree of overlap of members between the groups is equal to or greater than a predetermined threshold value;
- (d) selecting, by the processor, two groups different from each other;
- (e) determining, by the processor, whether or not to integrate the two selected groups on the basis of the degree of overlap of members between the two selected groups,
- (f) integrating, by the processor, the two selected groups into one group on condition that the two selected groups are determined to be integrated;
- (g) repeating operations (d)-(f) until no two groups to be integrated exist; and
- (h) analyzing, by the processor, texts of groups remaining after group integration, on the basis of attribute information of the texts of the remaining groups, where the attribute information is previously associated with individual texts.

7. A non-transitory computer readable recording medium in which a text processing program is recorded, the text processing program causing a computer to perform:
- (a) entailment recognition processing of performing entailment recognition between texts on given texts;
- (b) group generation processing of selecting an individual text and generating a group including texts entailing the selected text as members;
- (c) group integration processing of integrating groups in the case where groups satisfy a condition that the degree of overlap of members between the groups is equal to or greater than a predetermined threshold value;
- (d) group integration processing of selecting two groups different from each other;
- (e) group integration processing of determining whether or not to integrate the two selected groups on the basis of the degree of overlap of members between the two selected groups,
- (f) group integration processing of integrating the two selected groups into one group on condition that the two selected groups are determined to be integrated;
- (g) group integration processing of repeating operations (d)-(f) until no two groups to be integrated exist; and
- (h) analysis processing of analyzing texts of groups remaining after group integration, on the basis of attribute information of the texts of the remaining groups, where the attribute information is previously associated with individual texts.

\* \* \* \* \*